United States Patent
Fu et al.

(10) Patent No.: US 10,375,782 B2
(45) Date of Patent: Aug. 6, 2019

(54) LED ARRANGEMENT AND LED DRIVING METHOD

(71) Applicant: SIGNIFY HOLDING B.V., Eindhoven (NL)

(72) Inventors: Jie Fu, Shanghai (CN); Shu Xu, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/737,886

(22) PCT Filed: Jun. 8, 2016

(86) PCT No.: PCT/EP2016/063038
§ 371 (c)(1),
(2) Date: Dec. 19, 2017

(87) PCT Pub. No.: WO2016/202665
PCT Pub. Date: Dec. 22, 2016

(65) Prior Publication Data
US 2018/0302963 A1  Oct. 18, 2018

(30) Foreign Application Priority Data

Jun. 19, 2015 (WO) ................ PCT/CN2015/081910
Oct. 29, 2015 (EP) ..................................... 15192082

(51) Int. Cl.
*H05B 33/08* (2006.01)
*F21Y 105/12* (2016.01)
*F21Y 115/10* (2016.01)

(52) U.S. Cl.
CPC ....... *H05B 33/0824* (2013.01); *H05B 33/083* (2013.01); *H05B 33/0812* (2013.01);
(Continued)

(58) Field of Classification Search
CPC ............ H05B 33/0824; H05B 33/0812; H05B 33/0845
See application file for complete search history.

(56) References Cited

U.S. PATENT DOCUMENTS 8,896,235 B1  11/2014  Shum et al.
2013/0285083 A1*  10/2013  Sun ........................ H01L 27/15
                                                   257/89
(Continued)

FOREIGN PATENT DOCUMENTS

DE  202013000064 U1  1/2013
EP      2563094 A2   2/2013

*Primary Examiner* — Dedei K Hammond
*Assistant Examiner* — Raymond R Chai
(74) *Attorney, Agent, or Firm* — Akarsh P. Belagodu

(57) ABSTRACT

An LED arrangement uses a tapped driver driven by a rectified mains input and placed over a light output surface. There are at least first and second groups of LEDs on the light output surface. The total light output density for the LEDs of the second group (which are turned on for less of the mains cycle) per unit area of the light output surface is greater than the total light output density for the LEDs of the first group per unit area of the light output surface. A fraction of a light emitting surface of the second group (16) of LEDs to a second area (20B) of the light output surface occupied in a macro view by the second group (16) of LEDs, is larger than a fraction of a light emitting surface of the first group (14) of LEDs to a first area (20A) of the light output surface occupied in a macro view by the first group (14) of LEDs. This means the light output density when averaged over time is made more consistent between the two (or more) groups of LEDs.

18 Claims, 3 Drawing Sheets

(52) U.S. Cl.
 CPC ...... *H05B 33/0845* (2013.01); *F21Y 2105/12* (2016.08); *F21Y 2115/10* (2016.08)

(56) References Cited

U.S. PATENT DOCUMENTS

| | | | |
|---|---|---|---|
| 2014/0292213 A1* | 10/2014 | Yoon | H05B 33/0821 315/192 |
| 2014/0312771 A1* | 10/2014 | Lee | H05B 33/0803 315/113 |
| 2016/0007420 A1* | 1/2016 | Gong | H05B 33/0815 315/187 |
| 2017/0215239 A1* | 7/2017 | Deng | H05B 33/0815 |

\* cited by examiner

LED ARRANGEMENT AND LED DRIVING METHOD

CROSS-REFERENCE TO PRIOR APPLICATIONS

This application is the U.S. National Phase application under 35 U.S.C. § 371 of International Application No. PCT/EP2016/063038, filed on Jun. 8, 2016, which claims the benefit of International Application No. PCT/CN2015/081910, filed on Jun. 19, 2015 and European Patent Application No. 15192082.4, filed on Oct. 29, 2015. These applications are hereby incorporated by reference herein.

FIELD OF THE INVENTION

This invention relates to an LED arrangement and LED driving method, in particular which makes use of a linear tapped driver architecture.

BACKGROUND OF THE INVENTION

The available space for an LED driver has limited many retrofit applications for LED lamps, such as a tubular LED lamp. The traditional LED architecture and driver topology for tubular LEDs requires a driver space much larger than the space that the existing tube dimensions (e.g. a T5 tube) can offer. A tapped linear driver design is therefore considered as a good alternative solution for applications with space constraints, since it requires much smaller power components and enables the driver size to be minimized.

A problem with the use of a tapped linear driver is that different sets of LEDs are turned on at different times and for different duration, for example at different interval of a mains cycle. This gives rise to a different light distribution and output intensity for the different sets. Such a tapped linear driver is disclosed in U.S. Pat. No. 8,896,235B1. In this prior art, the sets are turned on in a monotonically accumulative manner namely a first set is turned; then a second set is turned on together with the first set; and then a third set is turned on together with the first and the second set. In this prior art, LEDs in the set that is turned on for longest duration is placed at the center.

Another prior art DE202013000064U1 shows a non-monotonically turning on order wherein the tapped sets in tapped linear driver can be turned on and turned off many time when the voltage increases from zero crossing to the peak. In this prior art, some set is configured to provide more light output to a working plane while some set is configured to provide less light output for indirect lighting.

SUMMARY OF THE INVENTION

There is a need for a low-cost and compact driver architecture, such as a linear tapped driver, which does not suffer the drawbacks of a light output variation over area. It would be advantageous to provide a lighting structure that uses tapped linear driver but also has a uniform/even light output among different tapped groups throughout the overall light output surface such as the whole lamp.

The invention is defined by the claims.

According to examples in accordance with an aspect of the invention, there is provided a LED arrangement placed over a light output surface, comprising:

a first group of LEDs on the light output surface ; and a second group of LEDs on the light output surface and in series with said first group of LEDs, wherein said first group of LEDs is adapted to be kept turning on and the second group of LEDs is adapted to be bypassed when the mains input is below a first threshold, and said first group of LEDs and the second group of LEDs are adapted to be kept turning on when the mains input is above the first threshold, and the total light output density for the LEDs of the second group per unit area of the light output surface is greater than the total light output density for the LEDs of the first group per unit area of the light output surface, wherein a fraction of a light emitting surface of the second group of LEDs to a second area of the light output surface occupied in a macro view by the second group of LEDs, is larger than a fraction of a light emitting surface of the first group of LEDs to a first area of the light output surface occupied in a macro view by the first group of LEDs.

This arrangement for example provides a tapped linear AC LED driver. The groups of LEDs may be driven together or else only one may be driven when the input voltage is low. For example, each group of LEDs may have its own current source arrangement. Thus, a first current is driven through only the first group of LEDs if the rectified mains voltage is only sufficient to operate the first group of LEDs.

If the rectified mains voltage is sufficient to drive a current through both groups of LEDs, then a second current is driven through the series connection of the first and second groups of LEDs. This is the general arrangement of a tapped linear driver. It means that some LEDs are on for a different duration than others. By making the light output density greater for the second group, the time-average light output intensity per area of the light output surface is made closer to the average light output intensity per area of the first group. In other words, the luminous emittance ($lm/m^2$) over time may be made more uniform.

By "light output density" is meant the product of the light output intensity per unit area ($candelas/m^2$) of an LED chip multiplied by the light emitting surface of that LED chip. Thus, it is a measure of the total light intensity output of an LED chip or an encapsulated LED chip package. The "total light output density" is this measure for all LEDs of a group.

Thus, by "the total light output density . . . per unit area of the light output surface" is meant the total effective light output intensity normalized to the area of the light output surface, in particular the area of the light output surface which is occupied in a macro view by that group of LEDs. In other words, it is the surface throughout which that group of LEDs is distributed and seen as providing illumination. It does not mean the small footprint of the LED on the light output surface.

For example, the first LED arrangement will occupy an overall first area of the light output surface, but only a portion of this first area which is LED chips is actually light emitting because the light output surface further includes the spaces between LED chips. Assuming the same output intensity per unit area of the light emitting surface of LED, the size of this portion relative to the overall first area is what is important. The combination of the overall areas of the different groups of LEDs makes up the full light output surface (part of which is light emitting surfaces namely the LED chip/footprint and other parts of which are spaces between the light emitting surfaces).

This less turning on duration of the second group and the higher light emitting surface fraction of the second group could compensate with each other. In other words, the LEDs turned on for less duration is with a high light emitting surface fraction. Thus due to the human eye's perception delay, the same light comes out of the second area as that of the first area, and the whole light output surface emits the same light and is more uniform.

The LED arrangement may further comprise:

at least one further group of LEDs in series with said first group and said second group, wherein said second and third groups of LEDs is adapted to be bypassed when the mains input is below the first threshold, and said third group of LEDs is adapted to be bypassed when the mains input is above said first threshold and below a second threshold, said first group of LEDs, the second group of LEDs and at least one further group of LEDs are adapted to be kept turning on when the mains input is above the second threshold, wherein the total light output density for the LEDs of the or each further group per unit area of said light output surface is greater than the total light output density for the LEDs of the preceding group per unit area of said light output surface, wherein a fraction of a light emitting surface of the third group of LEDs to a third area of the light output surface occupied in a macro view by the third group of LEDs, is larger than the fraction of to light emitting surface of the second group of LEDs to the second area of the light output surface occupied in a macro view by the second group of LEDs.

In this way, the same approach is extended to three or more groups of LEDs in a sequential tapped arrangement.

The densities are for example selected such that the total light output amount for the LEDs of the second group per unit area and per unit time is substantially equal to the total light output amount for the LEDs of the first group per unit area and per unit time.

In this way, the intensity per unit area (i.e. the emittance) remains substantially constant as the driver cycles through the different combinations of groups of LEDs.

For example, averaged over an integer number of cycles of the mains input, the light output amount of the second group of LEDs per unit area of the light output surface, and of any further groups is between 0.9 and 1.1 times the light output of the LEDs of the first group per unit area of the light output surface, more preferably between 0.95 and 1.05 times.

In this way, the different LED groups are made to emit light with roughly the same intensity per unit area, i.e. the same visible output brightness over area when averaged over time. The visible light is uniform throughout the light output surface, and the drawback of the tapped linear driver is compensated.

To realize the different output density per unit area for the different groups, the LED chips of the LEDs of the second group and any further group may each have a larger size than that of the LEDs of the preceding group. The number of LEDs in each group per unit area of the light output surface may be the same, namely with the same pitch.

This provides a first way of making the time-average intensity closer, by having larger LEDs when those LEDs are turned on for a shorter time. In some implementations, the size of the overall LED package that encapsulates the LED chips may be the same or different. Thus LED packages of a given size may have LED chips of different size. This means the footprint for all LED packages can be made the same.

In another approach, the number of LEDs of the second group and any further group per unit area of the light output surface is larger than that of the LEDs of the preceding group, and the size of LEDs in each group is the same, namely using a different pitch.

This provides a second way of differentiating the output density per unit area and in turn making the time-average intensity closer, by having more closely packed LEDs when those LEDs are turned on for a shorter time.

The above first and second approaches may also be combined. In one such combination, larger LED chips are more closely placed with respect to smaller LED chips.

The first group may be regulated by a first current source arrangement when the mains input is below a first threshold, and the first group and second group may be regulated by a second current source arrangement when the mains input is above said first threshold, wherein the second current source arrangement and any further current source arrangement drives a larger current than the preceding current source arrangement.

In this way, a larger current is used when more series LEDs are being driven. This matches the input current with the sine wave of the mains input voltage and reduces total harmonic distortion.

The light output density of each group per unit area of the light output surface is adapted to compensate the difference in light output amount of each group when driven by the current regulated by the first current source arrangement and the later current source arrangement or arrangements during a given mains cycle or rectified mains cycle. For example, for a 50 Hz mains, the mains cycle is 20 ms and a rectified mains cycle is 10 ms.

This means the light output intensity averaged over time is made substantially equal for the different groups of LEDs.

Each group of LEDs may be associated with a current source and a control switch, and the driver further comprises a driver for controlling the control switches. The driver is preferably adapted to control the control switches with a non-overlapping sequence.

Thus, one current source is turned on at a time, based on the level of the rectified mains input.

Examples in accordance with another aspect of the invention provide a method of controlling an LED arrangement, comprising:

during a first portion of a mains input cycle below a first threshold voltage, keeping driving a first current through a first group of LEDs; and during a second portion of the mains input cycle above the first threshold voltage, keeping driving a second current through a second group of LEDs and through the first group of LEDs, wherein the total light output density for the LEDs of the second group per unit area of the light output surface is greater than the total light output density for the LEDs of the first group per unit area of the light output surface.

The method may further comprise:

during one or more further portions of the mains input cycle above a further threshold voltage, keeping driving a respective further current through a respective further group of LEDs and through the preceding groups of LEDs, wherein the total light output density for the LEDs of the or each further group per unit area of the light output surface is greater than the total light output density area for the LEDs of the preceding group per unit area of the light output surface, wherein a fraction of a light emitting surface of the further group of LEDs to a further area of the light output surface occupied in a macro view by the further group of LEDs, is larger than the fraction of the light emitting surface of the preceding group of LEDs to the preceding area of the light output surface occupied in a macro view by the preceding group of LEDs.

When averaged over an integer number of cycles of the mains input, the light output amount of the second group of LEDs per unit area of the light output surface, and of any further groups, may be between 0.9 and 1.1 times the light output of the LEDs of the first group per unit area of the light output surface, more preferably between 0.95 and 1.05 times.

Control switches which each couple a current source to a respective group of LEDs may be operated with a non-overlapping sequence.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides an LED arrangement which uses a tapped driver driven by a rectified mains input. There are at least first and second groups of LEDs on a light output surface, which may be the tubular surface of a tubular LED lamp that provides the illumination. The second group of LEDs is bypassed when the input voltage is less than a certain threshold while the first group is still turned on. The total light output density for the LEDs of the second group (which are turned on for less of the mains cycle) per unit area of the light output surface is greater than the total light output density for the LEDs of the first group per unit area of the light output surface. This means the light output density per unit area when averaged over time is made more consistent between the two (or more) groups of LEDs.

Figure 1:
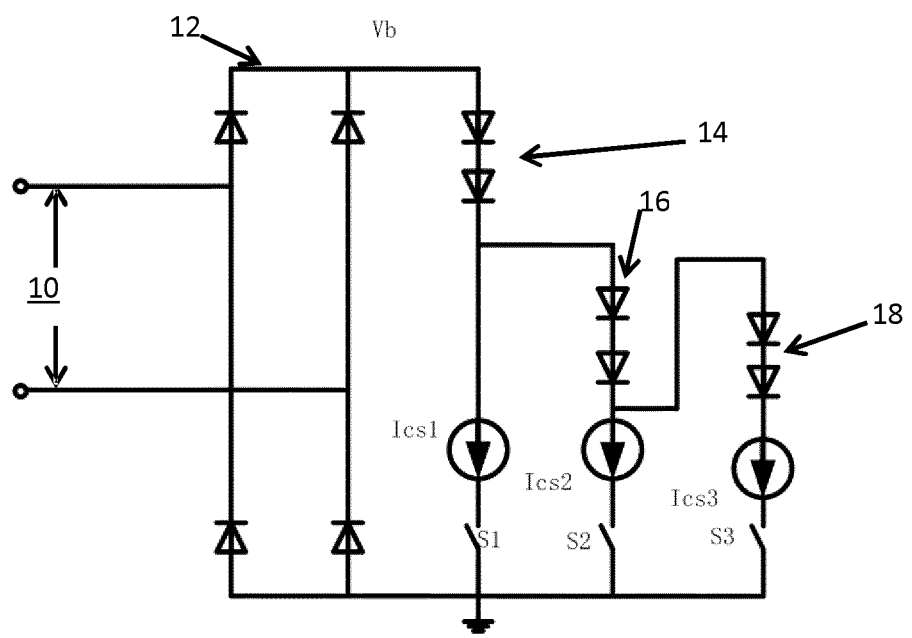
FIG. 1 shows a known LED arrangement with a linear tapped LED driver.

FIG. 1 shows a known tapped linear LED driver architecture which may be used to implement the LED arrangement of the invention.

The circuit of FIG. 1 comprises a mains input 10 which is provided to a diode bridge rectifier 12. The rectified output Vb is provided to three strings of LEDs. A first string 14 is between the rectified output and a first current source Ics1 which sinks to ground.

A second string 16 is in series with the first string 14 between the rectified output and a second current source Ics2 which sinks to ground. Thus, the first current source Ics1 connects to the junction between the first and second LED strings 14,16. A third string 18 is in series with the first and second strings 12,14 between the rectified output and a third current source Ics3 which sinks to ground. Thus, the second current source Ics2 connects to the junction between the second and third LED strings 16,18.

Each current source has an associated series control switch S1, S2, S3.

The three switches S1, S2, S3 are controlled according to the mains input voltage. When the rectified mains voltage Vb is higher than a first threshold that is the forward voltage of LED string 14 but lower than a second threshold that is the sum of forward voltage of LED strings 14 and 16, S1 is at the "on" state, and S2 and S3 are at the "off" state. Only LED string 14 is turned on.

When the rectified mains voltage Vb is higher than the forward voltage of LED string 16 plus LED string 14 but lower than the voltage of LED string 14 plus LED string 16 plus LED string 18, S1 and S3 are at the "off" state, and S2 is at the "on" state. LED strings 14 and 16 are turned on.

Finally, when the rectified mains voltage Vb is higher than the sum of forward voltage of all three LED strings, S3 is at the "on" state, and S1 and S2 are at the "off" state. LED strings 14, 16 and 18 are turned on.

In this case the LED packages of the overall LED device are thus separated into three groups to be driven by the linear tapped driver.

The architecture may be scaled to four or more groups, or be scaled to two groups.

It will be seen that over the time, the string 14 is turned on for more time than the string 16 which is turned on for more time than the string 18.

Figure 2:
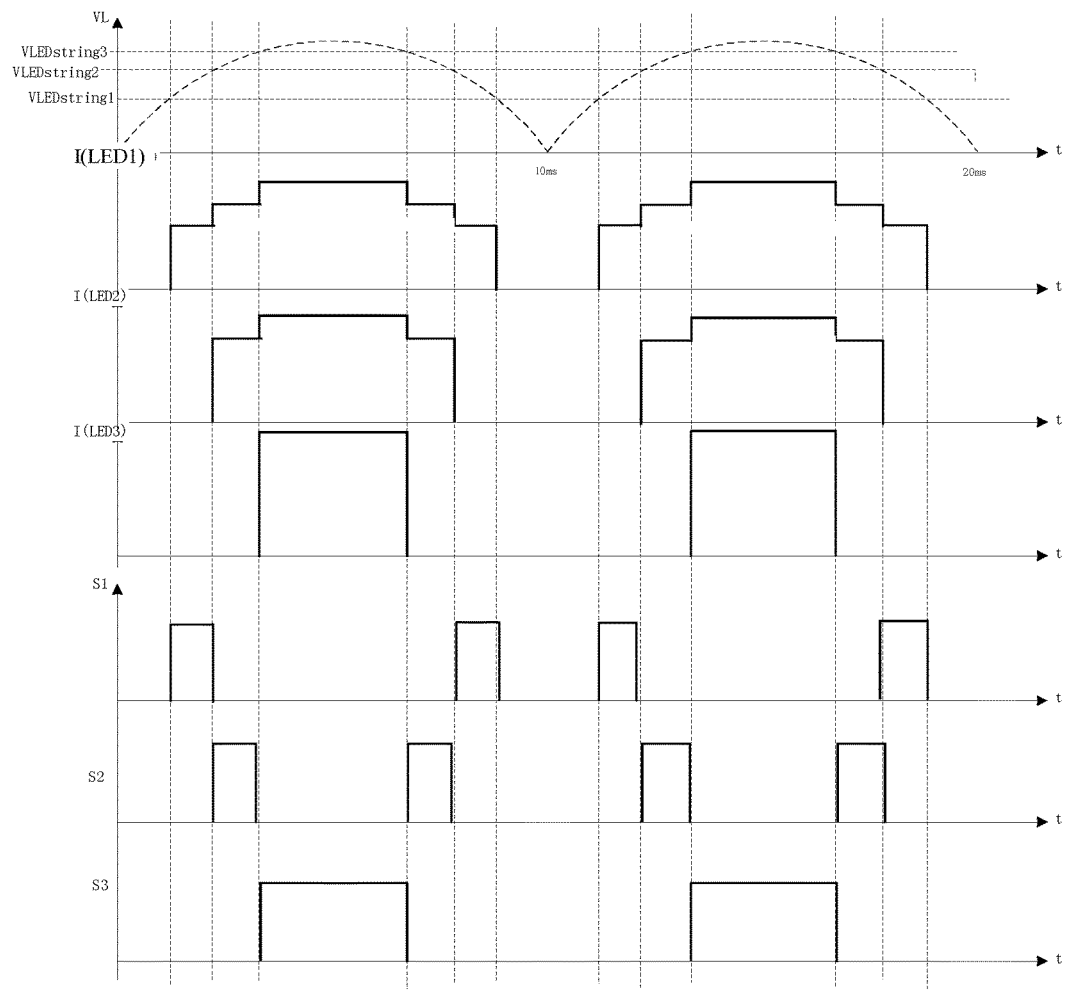
FIG. 2 shows waveforms to explain the operation of the LED arrangement of FIG. 1.

The operation can be seen in FIG. 2. The top plot shows the mains input voltage and the three threshold voltages used to control the switches. VLEDstring1 is the voltage needed to drive current through the string 14 alone. VLEDstring2 is the voltage needed to drive current through the series combination of strings 14 and 16. VLEDstring3 is the voltage needed to drive current through the series combination of all three strings.

The current waveform through the three strings is shown in the next three plots as I(LED1), I(LED2) and I(LED3). This assumes that Ics3>Ics2>Ics1 for ease of representation, but they may be the same in a simplified implementation such as low power lamps wherein the total harmonic disorder is not a crucial problem.

The different groups of LEDs may for example be different color LEDs or all are white.

The on-time for each group of LEDs is different. If they are driven with the same current, the average light output in a given time is equal to the average power on time. The consequence is that total lumen outputs for the LEDs in different groups, and therefore at different segment locations of the light emitting surface, are varied. This leads to unwelcome light uniformity changes if the same LED distribution is provided in the overall light output surface as in traditional linear LED light sources. One way to solve this problem is blending/interleaving the LEDs of different groups but this needs complex wiring.

The invention is based on redefining the distribution of LEDs of the light output surface (e.g. strip) to be suitable for a tapped linear driver.

Figure 3:
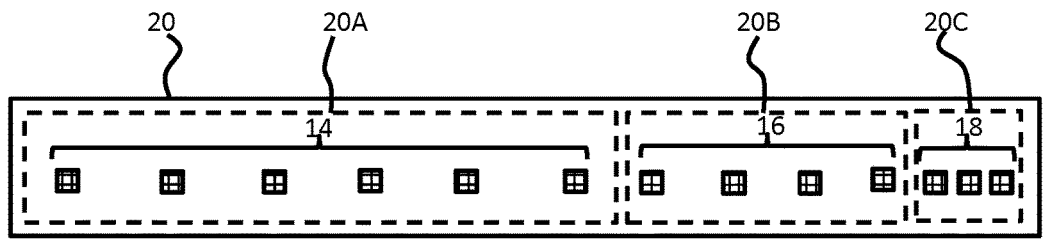
FIG. 3 shows a first example of a LED arrangement in accordance with the invention, wherein the pitch is different.

The invention may be applied to the LED arrangement as shown in FIG. 1 and driven according to the drive scheme shown in FIG. 2. The invention relates to the physical layout of LED chips on a shared light output surface. A first example is shown in FIG. 3.

The three LED strings 14,16,18 are shown and each string/group is consecutive without interleaved by LEDs of other group.

The first string 14 has 6 LEDs. With an operating voltage of 22V per LED, this gives VLEDstring1=132V. Light stays on for 130 units of time.

The second string 16 has 4 LEDs. With an operating voltage of 22V per LED, this gives VLEDstring2=132V+4×22V=220V. Light stays on for 90 units of time.

The third string 18 has 3 LEDs. With an operating voltage of 22V per LED, this gives VLEDstring3=220V+3×

22V=286V. Light stays on for 46 units of time. These units of time are provides simply to show the relative durations.

The three LED strings are on a common light output surface 20 which has light emitting surfaces (the LED chips) and non-light emitting surfaces (the spaces between the LED chips). With a constant current on LEDs, the total output power (light) on the three LED strings in a cycle stays at a ratio of about 34:16:6. Therefore the area for the three strings shall keep the same ratio to provide the same light output density.

Considering the first and second groups, 14, 16, the total light output density for the LEDs of the second group per unit area of the light output surface 20B is greater than the total light output density for the LEDs of the first group per unit area of the light output surface 20A This means that for the part of the light output surface 20B attributable to the second group 16, the relative area of the light emitting surfaces is greater than for the first group 14 (assuming the same light output intensity per unit of light emitting surface for simplicity—although this is not essential as explained below). There may be more LEDs in the first group (as in the example shown) so that the total light emitting surface of the first group may in fact be larger. However, the light emitting surface per amount of surface area occupied by the LED group (as shown by dotted rectangles) is larger for the second group. Thus, the light output density per unit area of light output surface occupied by the second group is greater. In this embodiment, in short, the LEDs are denser (i.e. closer together) along the tubular axis for the second group than the first group.

Thus, in the example shown in FIG. 3, the desired uniformity is achieved by placing identical LEDs (wioth the same LED size) closer together in the area allocated to the LEDs of the second group.

The same applies to the LEDs of the third group. They are arranged closer still in their light output surface 20C.

In this way, the total light output density is larger for the second group than for the first group. The second group has 4 units of light emitting surface (namely LEDs) concentrated into a smaller space than four corresponding units of the first group 14. A larger fraction of the area 20B of the second group 16 is light emitting. The third group 18 has three LEDs which occupy a smaller area than three of the LEDs from the first or second groups.

Put another way, the spacing between LEDs of the first group is larger than the spacing between LEDs of the second group, and the spacing between LEDs of the second group is larger than the spacing of the LEDs of the third group.

By making the light emitting surface compared to the overall area occupied greater for the groups when progressing along the sequence, the time-average light output intensity can be made the same for all groups. In other words, the luminous emittance ($lm/m^2$) when averaged over time may be made constant.

Thus, the total light output amount for the LEDs of the second group 16 per unit area and per unit time is substantially equal to the total light output amount for the LEDs of the first group 14 per unit area and per unit time. Over time, the first group 14 will in this example be driven at three different light intensities as shown in FIG. 2, whereas the second group 16 will be driven at two different light intensities. By taking these current drive levels into account, the intensity per unit area (i.e. the emittance) can be made the same for the different groups 14, 16, 18 when averaged over an integer number of cycles of the mains input.

Because the human eye will see the average light intensity, this means the light output intensity will look the same at all locations on the light output surface namely along the tube lamp, even if the different groups are spatially separated.

Perfect uniformity is not essential. For example, the time-averaged light output amount of the second group of LEDs per unit area of the light output surface, and of any further groups, may be between 0.9 and 1.1 times the time-averaged light output of the LEDs of the first group per unit area of the light output surface, more preferably between 0.95 and 1.05 times.

In this way, the different LED groups are made to emit light with roughly the same intensity per unit area, i.e. the same visible output brightness over area when averaged over time.

Figure 4:
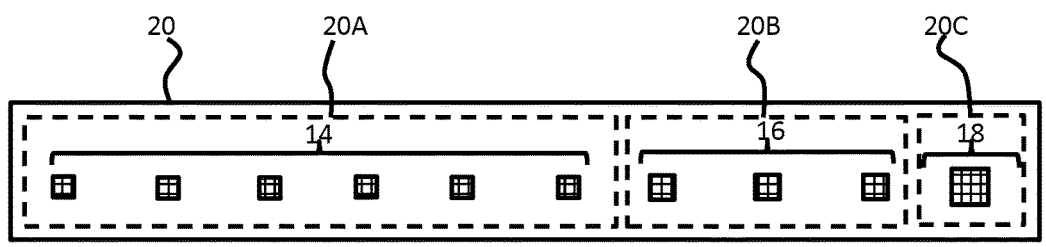
FIG. 4 shows a second example of a LED arrangement in accordance with the invention, wherein the LED chip size is different.
Figure 5:
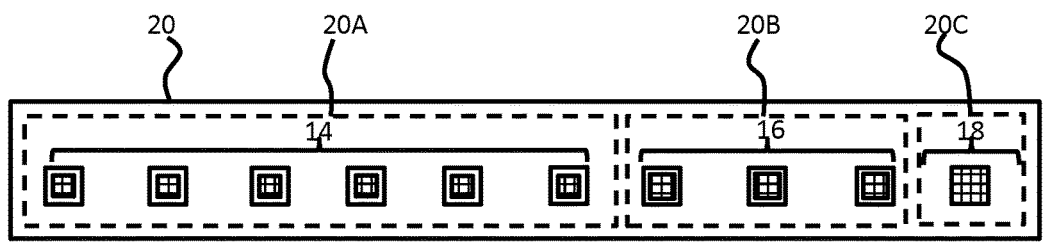
FIG. 5 shows a third example of a LED arrangement in accordance with the invention wherein the LED chip size is different but the LED package size is the same.

FIG. 4 shows a second example and FIG. 5 shows a third example. In both examples, instead of changing the packing density (pitch size) in each area, the LED pitch size is kept the same and the total LED chip size (namely the light emitting surface) of the LEDs in the different groups is different. The first group 14 has the smallest area LED chips, the second group has larger area LED chips and the third group has the largest area LED chips.

In FIG. 4, LED packages change size according to the chip size. In FIG. 5, the overall LED packages have the same size but contain different sizes of light emitting chips. In this way, in both FIGS. 4 and 5 the LED chip of the LEDs of the second group and any further group each have a larger size than that of the LEDs of the preceding group. The number of LEDs in each group per unit area of the light output surface, namely the pitch size may be the same. This means they are uniformly distributed (in terms of the pitch between centres).

In FIG. 5, the footprint of all LED packages is the same. Combined with a regular pitch this simplifies the design of the substrate—different LED packages just need to be mounted at the different locations.

This provides an alternative way of making the time-averaged intensity for the different groups of LEDs closer together.

Note that both approaches (of FIG. 3 on the one hand and FIGS. 4/5 on the other hand) may be combined, so that the neither the LED chip size is constant nor the pitch between LEDs. Thus, there are different ways to manipulate the density function as explained above.

As mentioned above, the drive current may be larger when there are more LED groups being driven. This reduces total harmonic distortion.

As mentioned above, it is not only the LED area or packing density that needs to be taken into account. The light output density of each group per unit area of the light output surface also compensates for the difference in light output amount of each group when driven by the various different currents which are used by the LED driver.

FIGS. 1 and 2 show an example of tapped linear driver in which each group of LEDs is associated with a current source and a control switch, and the driver comprises a driver for controlling the control switches. The driver controls the control switches with a non-overlapping sequence. However, alternative current source arrangements are possible, for example a single controllable current source may be controlled in synchronism with the switching of LED strings into circuit.

The LED strings may for example all be in series and each be bypassed by a respective bypass switch in parallel with the LED string. A single current source may then controlled to drive current through all strings. Different LED strings are bypassed at different times, and the current level is controlled in dependence on the switching state of the bypass switches.

Of course, the example of each group comprising only one series string of LEDs is simply for ease of explanation. Each group may comprise many parallel strings of LEDs, with a current selected accordingly. High voltage LEDs have been given as an example above, but there may of course be a larger number of lower voltage LEDs in each string.

In order to work out the required arrangement, the lumen per cycle for each group of LEDs is calculated based on the drive current waveform applied to the LEDs for the full mains cycle, taking account of the different currents and timing of operation.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A LED arrangement with a light output surface comprising an area of LED chips and an area between the LED chips, the LED arrangement comprising:
   a rectifier for rectifying a mains input;
   a first group of LEDs distributed on the light output surface; and
   a second group of LEDs distributed on the light output surface and in series with said first group of LEDs,
   wherein said first group of LEDs is adapted to be kept turned on and the second group of LEDs is adapted to be bypassed when the rectified mains input is below a first threshold, and said first group of LEDs and the second group of LEDs are adapted to be kept turned on when the rectified mains input is above the first threshold such that the second group of LEDs are turned on for a second duration less than a first duration for turning on the first group of LEDs in each cycle of the rectified mains input and
   a total light output density for the LEDs of the second group per unit area of the light output surface is greater than a total light output density for the LEDs of the first group per unit area of the light output surface, wherein a ratio of an area of LED chips of the second group of LEDs to a second area of the light output surface throughout which the second group of LEDs are distributed, is larger than a ratio of an area of LED chips of the first group of LEDs to a first area of the light output surface throughout which by the first group of LEDs are distributed,
   wherein the total light output density for the LEDs of the first group per unit area of the light output surface and the total light output density for the LEDs of the second group per unit area of the light output surface are selected such that a total light output amount for the LEDs of the second group per unit area and per unit time is substantially equal to a total light output amount for the LEDs of the first group per unit area and per unit time.

2. The LED arrangement as claimed in claim 1, wherein the first group of LEDs and the second group of LEDs are sequentially distributed without mixing with each other group, and the LED arrangement further comprising:
   a third group of LEDs in series with said first group of LEDs and said second group of LEDs, wherein said second and third groups of LEDs is adapted to be bypassed when the rectified mains input is below the first threshold, and said third group of LEDs is adapted to be bypassed when the rectified mains input is above said first threshold and below a second threshold, said first group of LEDs, the second group of LEDs and the third group of LEDs are adapted to be kept turned on when the rectified mains input is above the second threshold, such that the third group of LEDs are turned on for a further duration less than the second duration for turning on the second group of LEDs in each cycle of the rectified mains input,
   wherein the total light output density for the LEDs of the second group or of the third group per unit area of said light output surface is greater than the total light output density for the LEDs of the preceding group per unit area of said light output surface, wherein a ratio of an area of LED chips of the third group of LEDs to a third area of the light output surface throughout which the third group of LEDs are distributed, is larger than the ratio of the area of the LED chips of the second group of LEDs to the second area of the light output surface throughout which the second group of LEDs are distributed.

3. The LED arrangement as claimed in claim 2, wherein, averaged over an integer number of cycles of the mains input, the light output amount of the second group of LEDs per unit area of the light output surface, and of the third group is between 0.9 and 1.1 times the light output of the LEDs of the first group per unit area of the light output surface.

4. The LED arrangement as claimed in claim 2, wherein the LED chip of the LEDs of the second group and the third group each have a larger size than that of the LEDs of the preceding group, and the number of LEDs in each group per unit area of the light output surface is the same.

5. The LED arrangement as claimed in claim 2, wherein the number of LEDs of the second group and the third group per unit area of the light output surface is larger than that of the LEDs of the preceding group, and the size of LEDs in each group is the same.

6. The arrangement as claimed in claim 1, wherein the first group is regulated by a first current source arrangement when the rectified mains input is below the first threshold, wherein the first group of LEDs and second group of LEDs are regulated by a second current source arrangement when the rectified mains input is above said first threshold, wherein the second current source arrangement and any further current source arrangement drives a larger current than the preceding current source arrangement.

7. The LED arrangement as claimed in claim 6, wherein the total light output density of each group of LEDs per unit area of the light output surface is adapted to compensate a difference in light output amount of each group when driven by the current regulated by the first current source arrangement and any further current source arrangement during each mains cycle.

8. The LED arrangement as claimed in claim 1, wherein each group of LEDs is associated with a current source and a control switch, and a driver configured to control the control switch.

9. The LED arrangement as claimed in claim 8, wherein the driver is adapted to control the control switches with a non-overlapping sequence.

10. A lighting device with a light output surface and a LED arrangement placed over the light output surface according to claim 1, wherein the lighting device is a tube lamp, the first group of LEDs and the second group of LEDs are sequentially placed along the tube lamp without the LEDs in each groups interleaved.

11. A method of controlling an LED arrangement with a light output surface comprising an area of LED chips and an area between the LED chips, comprising:
during a first portion of a mains input cycle below a first threshold voltage, keeping driving a first current through a first group of LEDs; and
during a second portion of the rectified mains input cycle above the first threshold voltage, keeping driving a second current through a second group of LEDs and through the first group of LEDs, such that the second group of LEDs are turned on for a second duration less than a first duration for turning on the first group of LEDs in each cycle of the rectified mains input,
wherein a total light output density for the LEDs of the second group per unit area of the light output surface is greater than a total light output density for the LEDs of the first group per unit area of the light output surface and a ratio of an area of LED chips of the second group of LEDs to a second area of the light output surface throughout which the second group of LEDs are distributed, is larger than a ratio of an area of LED chips of the first group of LEDs to a first area of the light output surface throughout which the first group of LEDs are distributed,
wherein the total light output density for the LEDs of the first group per unit area of the light output surface and the total light output density for the LEDs of the second group per unit area of the light output surface are selected such that a total light output amount for the LEDs of the second group per unit area and per unit time is substantially equal to a total light output amount for the LEDs of the first group per unit area and per unit time.

12. The method as claimed in claim 11, further comprising:
during one or more further portions of the rectified mains input cycle above a further threshold voltage, keeping driving a respective further current through a respective further group of LEDs and through the preceding groups of LEDs, such that the further group of LEDs is turned on for a further duration less than the second duration for turning on the second group of LEDs in each cycle of the rectified mains input,
wherein the total light output density for the LEDs of the or each further group per unit area of the light output surface is greater than the total light output density area for the LEDs of the preceding group per unit area of the light output surface, wherein a ratio of an area of LED chips of the further group of LEDs to a further area of the light output surface throughout which the further group of LEDs are distributed, is larger than the ratio of an area of LED chips of the preceding group of LEDs to the preceding area of the light output surface throughout which the preceding group of LEDs are distributed.

13. The method as claimed in claim 11, wherein, averaged over an integer number of cycles of the mains input, a light output amount of the second group of LEDs per unit area of the light output surface, and of any further groups, is between 0.9 and 1.1 times a light output of the LEDs of the first group per unit area of the light output surface.

14. The method as claimed in claim 11, comprising controlling a control switch which couples a current source to a respective group of LEDs, with a non-overlapping sequence.

15. A LED arrangement comprising:
a first group of LEDs distributed on the light output surface; and
a second group of LEDs distributed on the light output surface, the first group of LEDS being arranged in series with said second group of LEDs,
wherein said first group of LEDs is adapted to be powered while the second group of LEDs is adapted to be bypassed in response to a rectified mains input being below a first threshold, and wherein the first group of LEDs and the second group of LEDs are adapted to be powered in response to the rectified mains input being above the first threshold such that the second group of LEDs are adapted to be powered for a shorter duration compared to the first group of LEDs for each cycle of the rectified mains input; and
wherein a total light output density for the second group of LEDs per unit area of the light output surface is greater than a total light output density for the first group of LEDs per unit area of the light output surface, wherein a ratio of an area of LED chips of the second group of LEDs to a second area of the light output surface throughout which the second group of LEDs are distributed, is larger than a ratio of an area of LED chips of the first group of LEDs to a first area of the light output surface throughout which by the first group of LEDs are distributed,
wherein the total light output density for the LEDs of the first group per unit area of the light output surface and the total light output density for the LEDs of the second group per unit area of the light output surface are selected such that a total light output amount for the LEDs of the second group per unit area and per unit time is substantially equal to a total light output amount for the LEDs of the first group per unit area and per unit time.

16. The LED arrangement as claimed in claim 15, wherein, averaged over an integer number of cycles of the rectified mains input, the light output amount of the second group of LEDs per unit area of the light output surface is between 0.9 and 1.1 times the light output of the LEDs of the first group per unit area of the light output surface.

17. The LED arrangement as claimed in claim 15, wherein each group of LEDs is powered by a respective current source and a respective control switch, and wherein the LED arrangement further comprises a driver adapted to control the control switches based at least upon the first threshold.

18. The LED arrangement as claimed in claim 17, wherein the driver is adapted to control the control switches with a non-overlapping sequence.

* * * * *